United States Patent Office 3,426,981
Patented Feb. 11, 1969

3,426,981
FOREIGN BODY GUARDS
Alastair William Rodney Allcock, Northwood, England, assignor to Minister of Technology in Her Britannic Majesty's Government of the United Kingdom of Great Britain and Northern Ireland, London, England
Filed Feb. 20, 1967, Ser. No. 617,173
Claims priority, application Great Britain, Feb. 28, 1966, 8,650/66
U.S. Cl. 244—1  8 Claims
Int. Cl. B64d 33/00, 45/00

ABSTRACT OF THE DISCLOSURE

An intake guard for a gas turbine engine has blades of streamline section arranged either radially or transversely. The main structure of each blade is rigidly constructed from steel or titanium and the nose is made of a deformable material so as to "mushroom" on being struck by a large foreign body such as a bird and thereby increase the shielding area. The protection of other parts of aircraft such as windscreens is envisaged as is also the utilising of hollow nose sections for hot air de-icing.

---

This invention relates to foreign body guards for the protection of aircraft from impact damage in flight. More particularly, though not exclusively, it relates to air intake guards for internal combustion engines, especially gas turbine engines, installed in aircraft.

One of the hazards of operating aircraft at low altitude levels is the possibility of damage resulting from striking large birds, particularly where they enter the air intake of a gas turbine engine.

Various proposals have been made from time to time for guards to protect engines from bird ingestion but, in general, the more effective they are for this purpose the more they affect intake characteristics leading to reduction in engine performance. There may be additional disadvantages by way of weight and drag penalties or icing dangers.

The present invention is concerned with a foreign body guard which will give an optimum of protection in relation to loss of engine or aircraft performance.

According to the invention a foreign body guard for aircraft comprises a plurality of vanes of low-loss aerofoil section spaced apart so as to obstruct the passage of any foreign body likely to be met in normal flight having such momentum as might lead to serious damage to the aircraft, said vanes offering minimal disturbance to air flow passing over them in a longitudinal sense and having nose portions capable of being deformed by impact with such foreign bodies to further obstruct the passage of said bodies.

According to a feature of the invention the nose portions of the vanes are hollow and may be utilised to conduct hot gases for de-icing purposes.

Various embodiments of the invention will now be described by way of example with reference to the accompanying diagrammatic drawings, of which:

Figure 1:
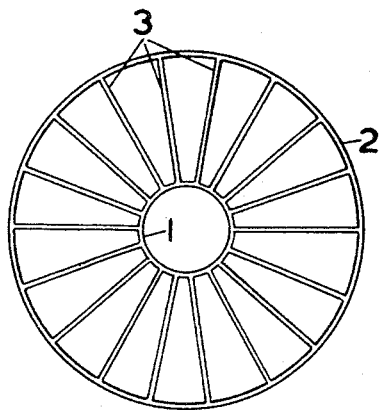
FIGURE 1 is a front view of a foreign body guard according to the invention.

Referring to FIGURE 1, a foreign body guard comprises two concentric annular frames 1, 2 having eighteen circumferentially-spaced vanes 3 extending radially between them. This particular guard is intended to be placed in the air intake of a gas turbine engine installation having an annular entry and an axial centrebody the central frame 1 fitting around the centrebody and the outer frame 2 fitting within the lip of the intake cowl. According to the installation requirements the frames 1 and 2 may be relatively displaced in an axial direction with the vanes swept forward or back as appropriate. In a modified form where an intake has no centrebody the inner ring is dispensed with and the vanes, or some of them, extended inwards to meet at the centre. The vanes may also be staggered (i.e., some being set back relative to the others) to reduce blockage.

Figure 2:
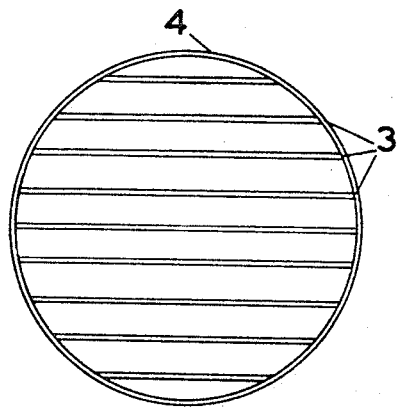
FIGURE 2 is a front view of another form of foreign body guard.

In FIGURE 2 a foreign body guard comprises a single annular frame 4, the vanes 3 in this case being disposed parallel to each other and extending transversely across the frame.

Figure 3:
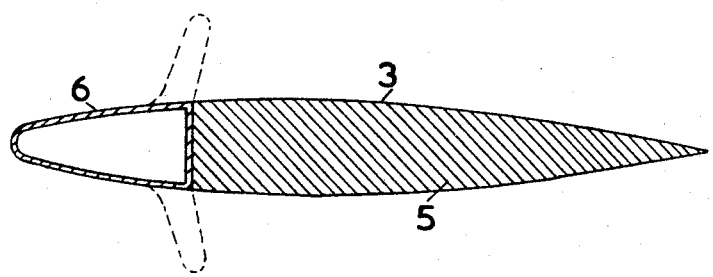
FIGURES 3 and 4 are transverse sections through alternative forms of vane suitable for use in the foreign body guards of FIGURES 1 and 2.

Referring now to FIGURE 3, the vanes 3 comprise a solid rear portion 5 to which is attached a hollow nose portion 6. The rear portion is constructed of steel or titanium while the nose section is of a light alloy. The vanes are of an aerofoil section with a "low loss" profile (i.e., one having a negligible effect on a longitudinal airflow).

On impact with a foreign body whose momentum is such that serious damage is likely to be caused were it to be drawn into the engine intake, the nose section of the vane will collapse to a mushroom-like profile as indicated in dotted lines in FIGURE 3. The collapse of the nose section absorbs some of the energy of the foreign body while the increased frontal area acts as a shield. If the foreign body were to be a large bird it would be disintegrated by the collapsed nose portion of the vane into a form which could be ingested by an engine without serious damage. Smaller birds capable of passing between adjacent vanes would also be capable of ingestion without significant damage.

The nose portion 6 may be attached to the rear portion 5 by any suitable known means including screws or quick release connections whereby it may be readily replaced if required.

It is possible that the nose portion might become detached on impact but due to its lightweight construction it would not in itself tend to be catastrophic and the exposed blunt portion of the vane will in general be adequate to complete the disintegration of a bird. As an additional safeguard a "weak link" arrangement could be incorporated such as where one end of a vane or its nose portion can become fairly readily detached from the supporting frame while the other remains attached thereto so as to prevent the said vane or nose portion being carried into the engine.

Figure 4:
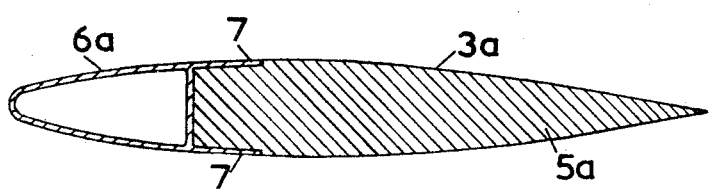

FIGURE 4 shows a vane 3a in which a nose portion 6a is provided with extensions 7 let into the upper and lower surfaces of a rear portion 5a.

The nose portions may alternatively be of deformable plastic material other than metal; it is envisaged that a rubber composition might be used whereby the original profile of the vane is restored after impact. Hot air or other gas would be circulated through the nose portions for de-icing purposes.

Although circular guards are shown in FIGURES 1 and 2 they can be made to any suitable configuration. Thus semi-circular guards could be used where intakes are formed in the sides of an aircraft fuselage or rectangular guards for protecting windscreens. The latter preferably would have transverse vanes so as to afford minimum interruption of vision, the vanes themselves might be adapted to be turned in order to accommodate a change of angle of view (e.g., at take-off or landing).

In an intake guard as in FIGURE 2 the vanes can be arranged either vertically or inclined at some other angle instead of horizontally as shown.

The spacing of vanes would be selected to give the best compromise between a minimum size of foreign body which must be intercepted and the least objectionable intake pressure loss (or reduction of visibility in the case of a windscreen guard). In the guard of FIGURE 1 additional intermediate vanes of less length than the others might be inserted.

The vanes have been shown as non-lifting aerofoils but in certain circumstances it may be advantageous to divert the airflow passing to an engine intake when a suitable profile would be utilised.

The efficacy of a guard can be further increased by supporting the vanes in a resilient or other shock-absorbing mounting. Alternatively, or additionally, the guard itself might be carried on an energy-absorbing mounting.

It is also envisaged that a guard according to the invention might be retracted into part of an aircraft structure when its use is not desired.

I claim:

1. A foreign body guard for aircraft comprising a plurality of vanes of low-loss aerofoil section spaced apart so as to obstruct the passage of any foreign body likely to be met in normal flight having such momentum as might lead to serious damage to the aircraft, said vanes offering minimal disturbance to airflow passing over them in a longitudinal sense and having separate nose portions adapted to be deformed by impact with such foreign bodies to further obstruct the passage of said bodies.

2. A foreign body guard according to claim 1 in which the vanes are circumferentially spaced about an axis extending generally longitudinally of the vanes and extend radially relative to said axis.

3. A foreign body guard according to claim 2 in which at least some of the vanes are inclined axially.

4. A foreign body guard according to claim 2 in which a proportion of vanes are staggered.

5. A foreign body guard according to claim 1 in which the vanes are disposed with their longitudinal axes substantially parallel.

6. A foreign body guard according to claim 1 in which the vanes comprise a solid rear portion and a hollow nose portion.

7. A foreign body guard according to claim 6 in which hot gas may be circulated through the nose portions of the blades.

8. A foreign body guard according to claim 1 having vanes comprising a substantially rigid rear portion and a nose portion of an elastic material.

References Cited

UNITED STATES PATENTS

| 2,553,512 | 5/1951 | Cotton | 244—1 X |
| 2,647,366 | 8/1953 | McCann | 60—39.09 X |
| 2,680,345 | 6/1954 | Frost | 60—39.09 |
| 3,121,545 | 2/1964 | Meletiou | 244—53 |

FOREIGN PATENTS 619,614   5/1961   Canada.

FERGUS S. MIDDLETON, *Primary Examiner.*

U.S. Cl. X.R.

60—39.09; 137—15.1; 244—53